(12) United States Patent
Bakhshi et al.

(10) Patent No.: US 9,115,812 B2
(45) Date of Patent: Aug. 25, 2015

(54) PLUG VALVE WITH A SPRING BIASED PLUG

(71) Applicant: Johnson Electric S.A., Murten (CH)

(72) Inventors: Majid Bakhshi, Berlin (DE); Joerg Gassmann, Dresden (DE); Wolfram Schwarze, Freital (DE)

(73) Assignee: Johnson Electric S.A., Murten (CH)

( * ) Notice: Subject to any disclaimer, the term of this patent is extended or adjusted under 35 U.S.C. 154(b) by 15 days.

(21) Appl. No.: 13/772,977

(22) Filed: Feb. 21, 2013

(65) Prior Publication Data

US 2013/0220445 A1 Aug. 29, 2013

(30) Foreign Application Priority Data

Feb. 23, 2012 (DE) .......................... 10 2012 003 397

(51) Int. Cl.
*F16K 5/06* (2006.01)
*F16K 5/04* (2006.01)
*F16K 5/20* (2006.01)

(52) U.S. Cl.
CPC ................. *F16K 5/04* (2013.01); *F16K 5/0668* (2013.01); *F16K 5/204* (2013.01); *F16K 5/06* (2013.01); *F16K 5/0689* (2013.01); *Y10T 137/6058* (2015.04)

(58) Field of Classification Search
CPC ......... F16K 5/04; F16K 5/204; F16K 5/0668; F16K 5/06; F16K 5/0689; Y10T 137/6058
USPC ............... 251/315.01, 315.08, 158, 160, 176, 251/180, 181, 184, 188, 192, 314–317; 137/315.25
See application file for complete search history.

(56) References Cited

U.S. PATENT DOCUMENTS

| 2,672,885 | A | * | 3/1954 | Cox et al. ................. 137/630.15 |
| 3,356,337 | A | * | 12/1967 | Olen ......................... 251/315.13 |
| 3,365,167 | A | * | 1/1968 | Scaramucci ................... 251/172 |
| 3,467,355 | A | * | 9/1969 | Burke ............................ 251/163 |
| 3,918,681 | A | * | 11/1975 | Eberhardt ...................... 251/317 |
| 3,940,107 | A | * | 2/1976 | Allenbaugh, Jr. .............. 251/297 |
| 4,073,473 | A | * | 2/1978 | Rihm et al. .................... 251/298 |
| 4,254,793 | A | * | 3/1981 | Scaramucci ............. 137/246.22 |
| 4,262,688 | A | * | 4/1981 | Bialkowski .................. 137/242 |
| 4,688,756 | A | * | 8/1987 | Kindersely .................. 251/183 |
| 5,137,259 | A | * | 8/1992 | Stein ............................ 251/174 |
| 6,161,569 | A |   | 12/2000 | Gonsior |

FOREIGN PATENT DOCUMENTS

| DE | 1671545 U | 2/1954 |
| DE | 2 118 110 | 10/1972 |
| DE | 24 44 716 | 4/1976 |
| DE | 32 45 688 A1 | 6/1984 |
| DE | 3245688 A1 | 6/1984 |

(Continued)

*Primary Examiner* — Marina Tietjen
(74) *Attorney, Agent, or Firm* — Muncy, Geissler, Olds & Lowe, P.C.

(57) ABSTRACT

In a plug valve with a plug supported around its axis of rotation in a flow passageway of the valve housing, the plug is supported in a floating manner against a spring force pressing the plug against an annular sealing element. The spring force is provided by a spring element bearing against the valve housing and engaging with a trunnion of the plug. The sealing element is supported in a fixed position against a flow passage opening.

18 Claims, 3 Drawing Sheets

(56) References Cited

FOREIGN PATENT DOCUMENTS

| DE | 85 16 162 U1 | 8/1985 |
| DE | 41 43 306 A1 | 10/1992 |
| DE | 92 03 321 U1 | 7/1993 |
| DE | 44 11 050 A1 | 10/1995 |
| DE | 298 06 226 U1 | 6/1998 |
| DE | 197 33 938 A1 | 3/1999 |
| DE | 10 2004 043 974 A1 | 3/2006 |

* cited by examiner

PLUG VALVE WITH A SPRING BIASED PLUG

CROSS REFERENCE TO RELATED APPLICATIONS

This non-provisional patent application claims priority under 35 U.S.C. §119(a) from Patent Application No. 10 2012 003 397.4 filed in Germany on Feb. 23, 2012, the disclosure of which is incorporated herein by reference.

FIELD OF THE INVENTION

This invention relates to a plug valve with a plug pivotably supported in the flow passageway of the valve housing.

BACKGROUND OF THE INVENTION

1. Technical Area

Such plug valves serve as shutoff devices for liquids, gases, vapors or granular flowable materials in pipeline networks or on containers. A so-called valve plug sits rotatably in a valve housing. The inflow opening is located on one side of the valve housing and the outflow opening on the other. A bore is formed through the plug perpendicular to its center axis to allow flow of the medium. If these two openings are connected together through the plug bore, a medium can flow through. If the plug is turned by 90°, it blocks the passageway with its plug body. Plug valves may be operated manually or with a motor.

2. Prior Art

For example, from DE 24 44 716 C, a shutoff valve, especially a ball valve, is known that has a sealing ring float-mounted on each of the sides (inflow and outflow), each side of which is essentially rigid in the area of its contact surface with the plug and is provided in the area of its sides adjacent to the housing cover, on its inner wall, with a radial annular groove exposed to the pressure of the medium from the connecting port, leaving an elastically supporting arm on the housing cover. On their sides facing the housing covers, the sealing rings are each provided with a projecting sealing surface on the outside.

From DE 10 2004 043 974 A1 a ball valve seal is known wherein in a housing, a ball with a passageway is arranged as a cutoff device. The ball is connected to a switching shaft provided with a seal against the outside. The sealing rings with circumferential seals, which provide a seal on both sides but are in sliding contact with the ball, are movable axially on both sides of the ball against the force of disc springs, which in turn receive axial pressure from a retaining ring. In the case of journal-bearing balls or a rigid sealing ring, on one side of the ball only one sealing ring may be provided with a disc spring on the ball side.

In DE 85 16 162 U1 a spring-loaded ball seat for ball valves is disclosed in which the seat contact bearing a sealing ring is pressed by spring elements against the valve ball, wherein the spring elements are sealed by sealing elements against the medium flowing through the ball valve. Preferably the seat contact has a hollow cylinder that seals off the cavity accommodating the spring elements with block seals against the medium flowing through the ball valve.

Technical Problem

The known plug valves either have rigidly supported, flexible sealing elements on both sides of a floating plug or plugs supported in one or two fixed bearing positions on or by means of trunnions, on both sides of the valve bodies of which axially movable sealing elements are in contact. The flexible sealing elements must either be integrated into an accurately dimensioned structure or require seals that are elastic over a broad range so that they can compensate well for tolerances. They must fulfill the functions of sealing and tolerance compensation between the plug and the valve housing as well as applying the necessary pressing force of a sealing lip on the plug. Especially in the case of plastic valves, a great problem exists here, since the manufacturing technology for the parts results in large variations in the dimensions, and the effects of temperature and medium lead to sometimes considerable deviations in dimensions. As a result of functional integration, the sealing elements must meet these contradictory requirements. Improvement of the sealing effect can be achieved if the sealing effect of the sealing elements is supported by separate spring elements. If the spring elements are integrated into the sealing elements, the designs become expensive and thus become costs drivers. If the sealing elements and the spring elements are separate individual parts, the additional spring elements arranged on one side or both sides always act directly on annular seating and/or sealing elements, which in a great variety of forms and combinations, seal off the plug bodies of the plug on both sides.

SUMMARY OF THE INVENTION

Hence there is a desire for a plug valve, such as a ball valve or cylinder valve, seals a rotating plug within the plug valve securely, over a long lifetime, and inexpensively, and does not result in leakage of the plug valve or fluctuations of the displacement force/displacement torque of the plug valve in the case of temperature- and manufacturing-related fluctuations in the installation dimensions as well as the material elasticity of the sealing element and the pressure fluctuations of the medium to be sealed off.

Accordingly, in one aspect thereof, the present invention provides a plug valve comprising: a valve housing having a flow passageway for the flow of a medium; an annular sealing element that is supported in a fixed position against an opening of the flow passageway; and a plug being supported for rotation about an axis of rotation in the flow passageway, wherein the plug is supported in a floating manner, and at least one spring element bearing against the valve housing presses the plug against the annular sealing element.

Preferably, the plug has a pair of trunnions defining the axis of rotation of the plug and the spring element engages with at least one of the trunnions to press the plug against the sealing element.

Preferably, there are two spring elements and the trunnions of the plug are supported in a floating manner in guide grooves in the valve housing against the spring elements respectively disposed in the guide grooves between the trunnions and bases of the guide grooves.

Preferably, the spring elements are helical springs, plate springs, rubber elements, or other spring elements.

Preferably, the trunnions are molded directly on the plug.

Preferably, the plug has a spherical or cylindrical body with at least one bore for passage of the medium.

Preferably, the plug, pressing against the sealing element, blocks off either the medium inflow side or the medium outflow side.

Preferably, the sealing element is a rubbery-elastic lip seal supported against a pressure ring.

Preferably, the trunnions are connected to the plug in a rotationally fixed manner and a manual or motor-actuatable control element engages on one of the trunnions or directly on the plug.

Preferably, the medium is a gas, a liquid, or a flowable solid.

According to a second aspect, the present invention provides a plug valve comprising: a valve housing having a flow passageway for the flow of medium; an annular sealing element that is supported in a fixed position against an opening of the flow passageway; and a plug having a pair of trunnions defining an axis of rotation, the plug being supported for rotation about the axis of rotation in the flow passageway; and at least one spring element bearing against the valve housing engages with at least one of the trunnions of the plug, wherein the plug is supported in a floating manner against a spring force, and the spring element presses the plug against the annular sealing element.

Advantages of the Invention

Because a strict functional separation is provided between the tasks of sealing and contact pressure and the spring elements do not press directly on the sealing elements, as combined seating/pressure and sealing rings on the plug body would do, but instead act on the trunnions of the plug, the resulting free selection of spring elements allows a largely independent adjustment of the contact force and a broad tolerance range of the system against geometric fluctuations and variations in the stiffness of the sealing materials. With a selection of suitable spring lengths and characteristics it is possible to adjust both the travel of the floating supported plug and the contact force. The plug can also turn easily because of the negligible frictional losses between the springs and the trunnions. In addition the spring elements in the guide grooves of the valve housing can be protected well from the medium flowing through. Although the plug advantageously "floats" in the valve housing, nevertheless it is carried accurately in the guide grooves and cannot move out of place as a result of asymmetric forces applied by the medium or the sealing elements and thus cause a risk of leaks.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
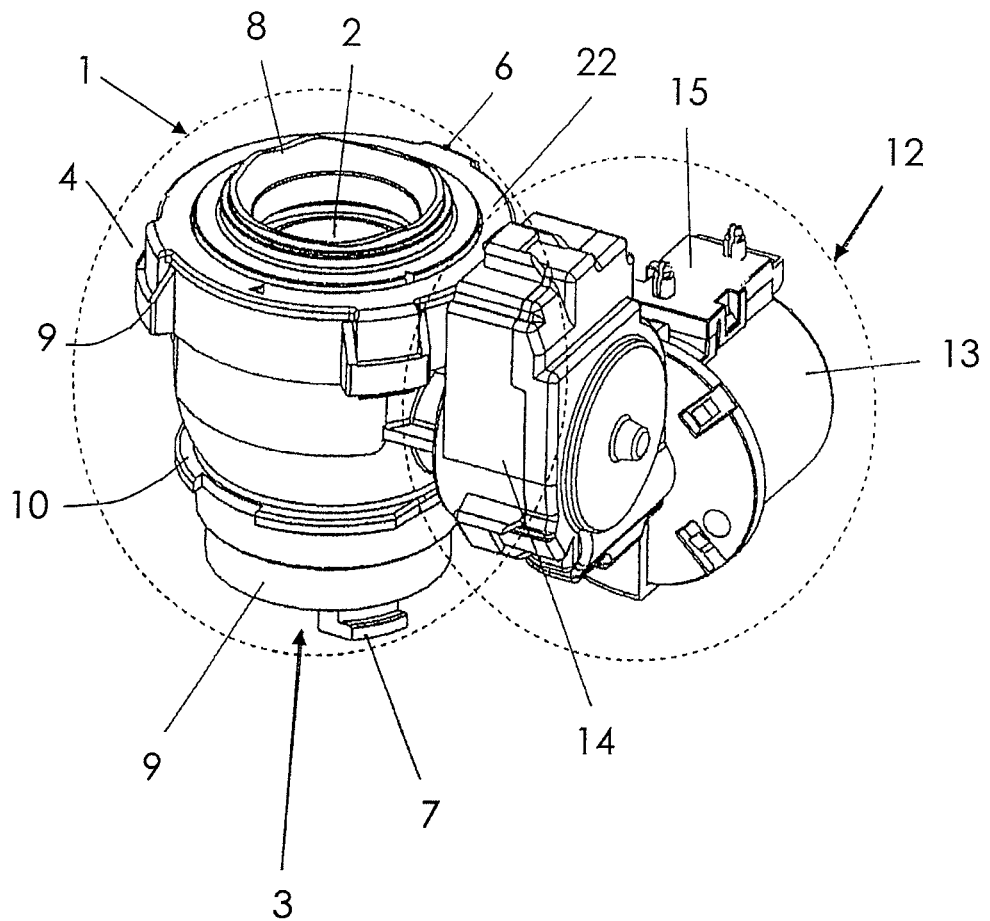
FIG. 1 is a perspective view of a motor-driven ball valve.

The invention will be described with reference to a ball valve. The ball valve according to the sole exemplary embodiment, shown in FIG. 1, has a one-piece valve housing 1 in the form of a hollow body with flow openings 2, 3 at the ends for passage of a medium, for example a gas. Two flange ends 4, 5 are provided at the flow openings of the valve housing 1. The upper flange end 4 has snap lock connectors 6 for connection of a pressure ring that is also used to connect a connecting line 8. The lower flange end 5 has bayonet contours 7 for a bayonet connection to a further connecting line not shown. In addition, the valve housing has outer contours 9, 10 to accommodate a coupling tool such as a hook wrench. The part of the valve housing 1 that is at the top in the figure is somewhat wider in diameter to accommodate a ball plug 11 shown in the sectional views of FIGS. 2 and 3. Attached to the side of the valve housing 1 is a motor-driven drive unit 12 for the ball valve plug, comprising a motor 13, a gearbox 14 and an electrical connection box 15. The outlet of the gearbox 14 is connected to the ball plug 11, to rotate the ball valve between open and closed positions.

Figure 2:
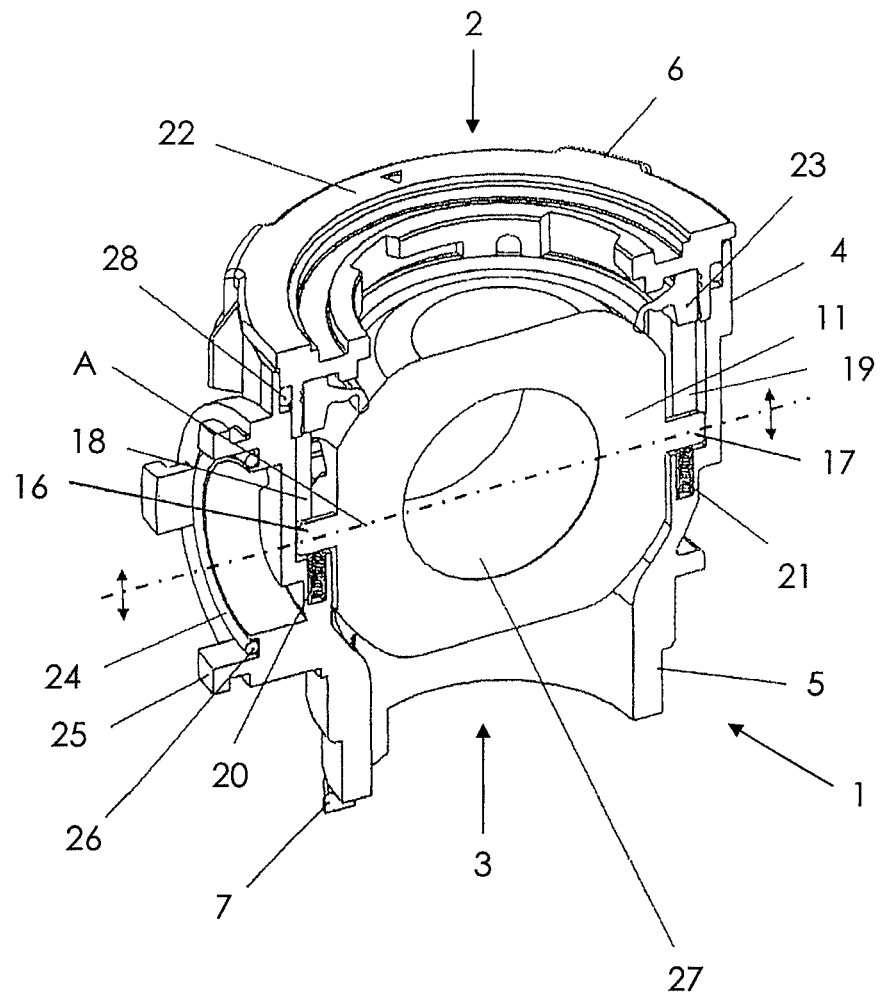
FIG. 2 is a sectional view of the ball valve of FIG. 1 in the closed position, without the drive unit.

FIG. 2 shows a sectional view through the ball valve in the closed position, with the drive unit removed. A bore 27 for passage of the medium through the ball plug 11 is perpendicular to the flow direction. It is recognizable that the top and center parts of the valve housing 1 are widened to receive the ball plug 11. The ball plug has two trunnions 16, 17, defining a rotational axis A of the plug. The ball plug 11 "floats" with its trunnions 16, 17 slidably received in guide grooves 18, 19. The guide grooves are formed in the side walls of the valve housing 1 and extend in the flow direction. Two helical springs 20, 21, are disposed in the guide grooves 18, 19, and extend between the bases of the grooves and the trunnions 16, 17 of the ball plug 11 to press the ball plug 11 against a sealing device that is inset at the upper end of the valve housing 1 in the Figure.

The sealing device comprises a pressure ring 22, a sealing element in the form of a lip seal 23 for the ball plug 11 supported against the ring, and an O-ring 28 for sealing the valve housing from the outside. The pressure ring 22 retains the lip seal 23 at the upper flange end 4 and is fixed to the valve housing 1 by snap lock connectors 6. The pressure ring 22 carries bayonet contours for a bayonet connection to the connecting line 8, such as a pipe or hose. The lip seal is preferably a rubbery-elastic lip seal having a lip that directly contacts the ball plug.

In the position shown, the ball shaped body of the ball plug 11 seals off the single medium stream against the lip seal 23 with the support of the spring force of the helical springs 20, which press against the trunnions 16, 17. In this manner the plug 11, carried by its trunnions 16, 17 in the guide grooves 18, 19, can move a few millimeters toward the lip seal 23. Responding to the opposing spring forces, the ball plug 11 "floats" between the lip seal 23 and the helical springs 20, 21, in a direction perpendicular to its trunnions 16, 17, which simultaneously form the axis of rotation A of the ball plug 11, in the extending direction of the guide grooves 18, 19, as indicated by the double arrows. An additional force component, which influences the floating movement of the ball plug 11, is generated by a pressurized, blocked-off medium. Depending on the flow direction of the medium blocked off by the ball plug 11, either the spring force of the helical springs 20, 21 is supported, or alternatively the spring force of the lip seal 23 is supported. As a result of the design disclosed it becomes possible to achieve reliable sealing of a plug valve with simply designed sealing and spring elements.

Naturally an adjusting element meshing with one of the trunnions 16, 17 for rotating the ball plug 11 must permit the linear movement of the trunnions 16, 17 in the guide grooves 18, 19. Corresponding couplings are part of the prior art. The motor drive unit 13 according to FIG. 1 can be fitted to a transverse flange 24 of the valve housing 1 likewise by means of a bayonet contour 25. The transfer of the adjusting force from the drive outlet shaft of the drive 14 to the trunnion 16 for example can take place by way of a rotationally fixed joint connection that does not interfere with the "floating" of the ball plug 11.

On the other hand, if the adjusting element acts directly on the ball plug 11, naturally this is released in such a way that a relative movement between the setting element and the ball plug 11 is possible.

Naturally there is also a need to seal off the transverse flange 24 from the medium to be blocked. In the outward direction an O-ring 26 assumes this function, and toward the inside, for example, a stuffing box, not shown in detail.

Figure 3:
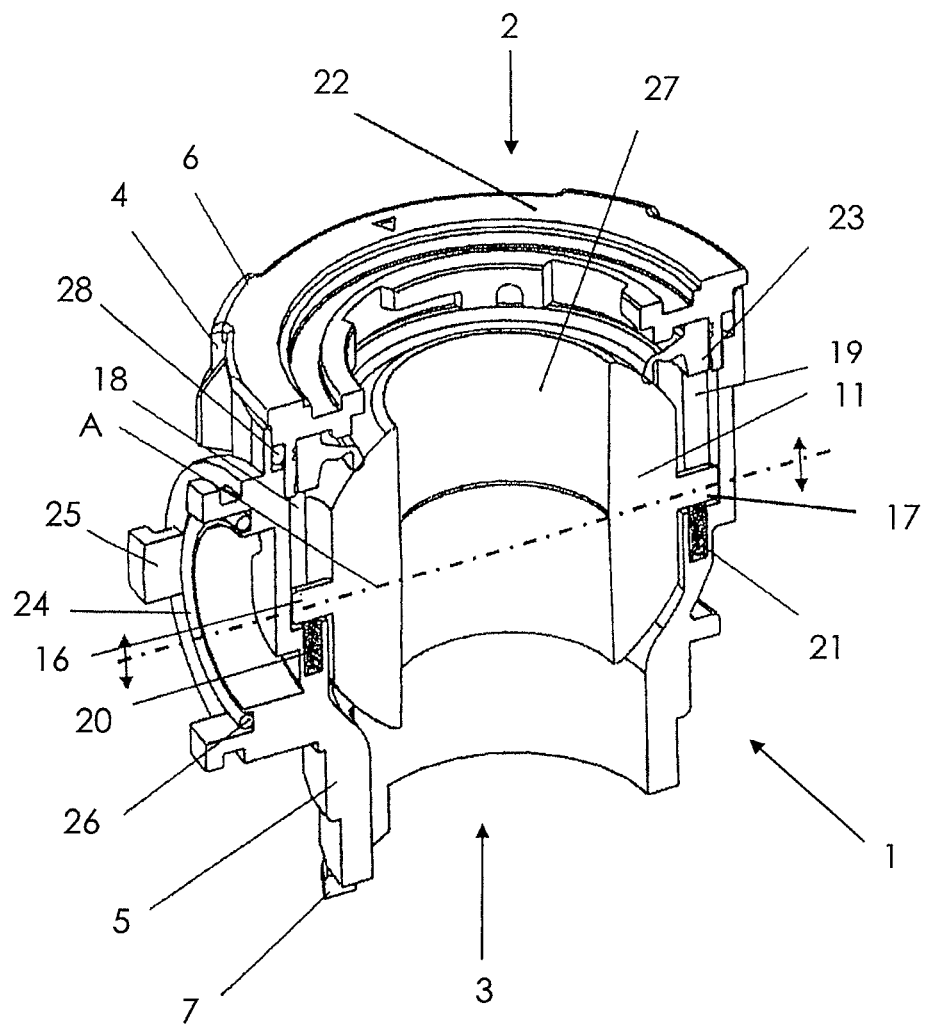
FIG. 3 is a sectional view of the ball valve of FIG. 1 in the open position.

In FIG. 3 the ball valve is shown in the open state in a sectional view, wherein identical reference symbols have been used. Whereas in FIG. 2 the bore 27 in the ball plug 11 for passage of the medium is positioned perpendicular to the flow direction, so that the ball plug causes blocking of the flow passage, the plug valve 11 according to FIG. 3 is rotated through 90° such that the bore 27 aligns with the flow passage. Consequently, the ball valve is in the open state.

The ball valve is easy to assemble. First the helical springs 20, 21 are placed in the guide grooves 18, 19. Then the ball plug 11 is put into place such that the trunnions 16, 17 glide along the guide grooves 18, 19 to the helical springs 20, 21. Then the annular lip seal 23 is inserted into the flange end 4 and secured with the pressure ring 22. An O-ring 28 is inserted between a collar of the valve housing 1 and the pressure ring 22. The assembly of this small number of components can be easily automated.

Although the exemplified embodiment is based on ball valves, the invention can likewise be used for valves with cylindrical plugs. In addition, instead of a motor drive unit, a manual operating element can be provided. It is also possible, in place of one or two helical springs, to use one or two disc springs or rubber elements. Instead of the two guide grooves, one annular groove can be provided, at the base of which a helical screw with the same diameter as the annular groove rests. It is also possible to provide a plug with only one trunnion. The trunnion or trunnions need only be connected with the plug in a rotationally fixed manner if they are to simultaneously transfer the rotational moment to the plug. They can be cast onto the plug or also inserted into the plug in a rotationally fixed manner. Naturally, screw couplings may also be provided instead of bayonet connections. Finally, on the other flow side, an additional pressure ring with an annular lip seal for the plug may also be provided.

Accordingly, although the invention has been described with reference to one preferred embodiment, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A plug valve comprising:
   a valve housing having a flow passageway for the flow of a medium;
   a plug supported in a floating manner for rotation about an axis in the flow passageway;
   an annular rubbery-elastic lip sealing element supported in a fixed position against an opening of the flow passageway, and comprising a main body and a contact lip extending radially and inwardly from a central portion of the main body, the contact lip having a free end bending towards and contacting the plug, wherein the free end of the contact lip of the annular rubbery-elastic lip sealing element bends towards the rotation axis of the plug; and
   at least one spring element bearing against the valve housing and pressing the plug against the contact lip the annular rubbery-elastic lip sealing element.

2. The plug valve of claim 1, wherein the plug has a pair of trunnions defining the axis of rotation of the plug and the at least one spring element engages with at least one of the trunnions to press the plug against the sealing element.

3. The plug valve of claim 2, wherein there are two spring elements and the trunnions of the plug are supported in a floating manner in guide grooves in the valve housing against the spring elements respectively disposed in the guide grooves between the trunnions and bases of the guide grooves.

4. The plug valve of claim 3, wherein helical springs, plate springs, rubber elements, or other spring elements are used as the spring elements.

5. The plug valve of claim 2, wherein the trunnions are molded directly on the plug.

6. The plug valve of claim 2, wherein the trunnions are connected to the plug in a rotationally fixed manner and a manual or motor-actuatable control element engages on one of the trunnions or directly on the plug.

7. The plug valve of claim 1, wherein the plug has a spherical or cylindrical body with at least one bore for passage of the medium.

8. The plug valve of claim 1, wherein the medium flows from an inflow side to an outflow side of the housing, and the plug, pressing against the annular rubbery-elastic sealing element, blocks off either the medium inflow side or the medium outflow side.

9. The plug valve of claim 1, wherein the annular rubbery-elastic lip sealing element is supported against a pressure ring.

10. The plug valve of claim 1, wherein the medium is a gas, a liquid, or a flowable solid.

11. A plug valve comprising:
    a valve housing having a flow passageway for the flow of a medium;
    a plug having a pair of trunnions defining an axis of rotation, the plug being supported in a floating manner for rotation about the axis in the flow passageway;
    an annular rubbery-elastic lip sealing element supported in a fixed position against an opening of the flow passageway, wherein the annular rubbery-elastic lip sealing element has a cross section substantially J-shaped and comprises a main body and a contact lip extending radially and inwardly from the main body and having a bent free end contacting the plug, wherein the free end of the contact lip of the annular rubbery-elastic lip sealing element bends towards the rotation axis of the plug; and
    at least one spring element bearing against the valve housing and engaging with at least one of the trunnions of the plug, the at least one spring element pressing the plug against the contact lip of the annular rubbery-elastic lip sealing element.

12. The plug valve of claim 11, further comprising a pressure ring fixed to the valve housing, the annular rubbery-elastic lip sealing element being retained in the pressure ring.

13. The plug valve of claim 12, wherein the pressure ring has a protrusion protruding towards the contact lip of the annular rubbery-elastic lip sealing element.

14. The plug valve of claim 1, further comprising a pressure ring fixed to the valve housing, the annular rubbery-elastic lip sealing element being retained in the pressure ring.

15. The plug valve of claim 14, wherein the pressure ring has a protrusion protruding towards the contact lip of the annular rubbery-elastic lip sealing element.

16. A plug valve comprising:
- a valve housing having a flow passageway for the flow of a medium, and defining a pair of first grooves and a pair of second grooves, each second groove recessed from a bottom of a respective first groove;
- a plug having a ball shaped body and a pair of trunnions integrally protruding from two opposite sides of the ball shaped body, the trunnions defining an axis of rotation and being supported in the first grooves in a floating manner for rotation about the axis in the flow passageway;
- an annular sealing element supported in a fixed position against an opening of the flow passageway; and
- a pair of spring elements bearing against the valve housing and pressing the trunnions of the plug, the trunnions being rotatable relative to the spring elements, each spring being arranged in such a manner that the most portion thereof is received in a respective second groove and the remaining portion thereof extending beyond the second groove and protruding into the first groove.

17. The plug valve of claim 16, wherein the plug is driven by a motor.

18. The plug valve of claim 16, wherein the annular sealing element is a rubbery-elastic lip seal and has a main body and a contact lip extending radially and inwardly from a central portion of the main body, the contact lip has a free end bending towards the axis of rotation and contacting the plug.

\* \* \* \* \*